US011004233B1

(12) United States Patent
Wang

(10) Patent No.: US 11,004,233 B1
(45) Date of Patent: May 11, 2021

(54) INTELLIGENT VISION-BASED DETECTION AND RANGING SYSTEM AND METHOD

(71) Applicant: Ynjiun Paul Wang, Cupertino, CA (US)

(72) Inventor: Ynjiun Paul Wang, Cupertino, CA (US)

( * ) Notice: Subject to any disclaimer, the term of this patent is extended or adjusted under 35 U.S.C. 154(b) by 0 days.

(21) Appl. No.: 16/864,914

(22) Filed: May 1, 2020

(51) Int. Cl.
*G06T 7/70* (2017.01)
*G06K 9/00* (2006.01)

(52) U.S. Cl.
CPC ............ *G06T 7/70* (2017.01); *G06K 9/00798* (2013.01); *G06T 2207/10012* (2013.01); *G06T 2207/10028* (2013.01); *G06T 2207/20084* (2013.01); *G06T 2207/20228* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2014/0104266 A1* | 4/2014 | Stone | G06F 30/00 345/419 |
| 2017/0193338 A1* | 7/2017 | Huberman | G06K 9/00791 |
| 2017/0206430 A1* | 7/2017 | Abad | G06T 5/00 |
| 2018/0276841 A1* | 9/2018 | Krishnaswamy | G06K 9/00671 |
| 2019/0001868 A1* | 1/2019 | Kaino | B60Q 1/1423 |
| 2019/0102677 A1* | 4/2019 | Kim | G06K 9/00805 |
| 2019/0349571 A1* | 11/2019 | Herman | H04N 13/282 |
| 2020/0105065 A1* | 4/2020 | Youngquist | H04N 5/2252 |
| 2020/0213498 A1* | 7/2020 | Broers | H04N 5/2352 |

OTHER PUBLICATIONS

Fidler et al. "3d Object Detection and Viewpoint Estimation with a Deformable 3D Cuboid Model", Advances in Neural Information Processing Systems (Year: 2012).*
Xiang et al. "Estimating the aspect layout of object categories", Computer Vision and Pattern Recognition [CVPR], 2012 IEEE Conference (Year: 2012).*

* cited by examiner

Primary Examiner — Frederick D Bailey

(57) ABSTRACT

An intelligent vision-based detection and ranging (iVidar) system consists of at least four cameras to form at least two stereo vision systems. The first pair of two cameras forms a first stereo vision system with a field of view A1 and has a baseline B1. The second pair of two cameras forms a second stereo vision system with a field of view A2 and has a baseline B2. Where B2 is greater than B1 and A2 is smaller than A1. One of the preferred configurations for the current invention is to mount the second stereo vision system field of view A2 to cover a perspective vanishing point in the along-track direction.

7 Claims, 5 Drawing Sheets

INTELLIGENT VISION-BASED DETECTION AND RANGING SYSTEM AND METHOD

BACKGROUND

For automotive vision sensors, image processing of road scenes can provide rich information about the road environment that other sensors (such as radar or lidar) might fail to obtain. Today, cameras are used in certain vehicles for lane detection and offer lane keeping assistance or lane departure warning systems. Furthermore, some vehicles already provide automatic traffic sign recognition systems that can inform a driver about the speed limit or other type of road conditions. Further on, with recent artificial intelligence advancements, cameras are able to detect pedestrians or cyclists, which would otherwise fail with radar sensors or lidar sensors.

Generally, for a camera, it is relatively easy to measure a cross-track (lateral) distance given adequate camera resolution. However, a current camera system with vision processing is less effective for an along-track (longitudinal) distance measurement of an object. A monocular system uses only one camera and exploits the geometry of the road scene, along with the knowledge about the size of the cars, for example, to estimate the along-track distance. On the other hand, a stereo vision-based system uses two cameras to estimate the 3D coordinates of an object directly by computing the epipolar line disparity similar to how a human visualize the distance through two eyes.

Current various vision-based camera systems have sensing ranges (distances) from up to 3 m to up to 80 m and a field of view (FOV) from around 20 degree to 180 degree depending on the sensing range (distance). Usually the wider is the FOV, the shorter is the sensing range (distance). In a stereo vision-based system, the depth capability rapidly drops with distance and limited to a range of up to around 40 m. Another limitation of current vision-based detection and ranging system is the accuracy: while radar and lidar have rather constant ranging errors over distance, the range accuracy of camera systems typically decreases quadratically with distance. For example, at 3 m, a range error of 5 cm is typically achievable, while the error at 40 m might grow rapidly up to around 3 m depends on the camera focal length and pixel size.

In a prior art disclosed by Adomat et al. in U.S. Pat. No. 10,334,234, it described a "stereo" system with two monocular cameras for a vehicle with two different field of views (FOV) in order to extend the sensing range. One camera has a smaller FOV to provide more resolution at far distance sensing and serves as a fixed zoom camera. While the other camera is with larger FOV to provide more coverage yet for shorter distance sensing. However, this embodiment is fundamentally not a stereo vision-based system. A stereo vision-based system requires both cameras cover more or less the same (overlap) FOV and the same pixel resolution to enable a stereo pair epipolar line disparity computation. In this disclosure, only the center portion of the field of view forms an overlap area of the two cameras FOVs. If stereo pair epipolar line disparity computation needs to be performed in this overlap area, it will also require to reduce the zoom camera (smaller FOV) pixel resolution to the same lower resolution of the other camera thus rendering the zoom effect in void. In summary, if this disclosed configuration is used for "stereo" vision, it does not extend the sensing range beyond the shorter distance (larger FOV) sensing camera.

In another prior art disclosed by Schmiedel et al. in U.S. Pat. No. 8,139,109, it described a vehicle management system consists of at least a first, a second, and a third video camera. The system is configured to receive input from a combination of at least two cameras selected from among the first, second, and third cameras based on an event associated with a vehicle to provide at least a first, a second, and a third stereo ranging depth. This disclosure tries to use the different baseline of stereo pair to extend the sensing range. However all three cameras have the same FOV (or focal length) thus limit their range extension up to the longest baseline to shortest baseline ratio. For example, in this disclosure, the longest baseline is 1.5 m and the shortest baseline is 0.5 m. Therefore, the distance (range) extension can only be up to 3×.

SUMMARY OF THE INVENTION

In one aspect, an intelligent vision-based detection and ranging (iVidar) system consists of at least four cameras to form at least two stereo vision systems. The first pair of two cameras forms a first stereo vision system with a field of view A1 at infinity and has a baseline B1. The second pair of two cameras forms a second stereo vision system with the a field of view A2 at infinity and has a baseline B2. Where B2 is greater than B1 and A2 is smaller than A1.

Also the field of view A1 of the first stereo vision system may have an overlap area with the field of view A2 of the second stereo vision system.

Additionally, an iVidar system may further consist of at least one monocular vision system with field of view A3. The field of view A3 may have an overlap area with field of view A1 and A2.

One of the preferred configurations for the current invention iVidar is to mount the second stereo vision system field of view A2 to cover a perspective vanishing point in the along-track direction.

Furthermore, to configure the baseline B2 at least 2× or greater than B1 and the field of view A1 at lease 3× or greater than A2. This results in that the second stereo vision system has at least 6× or greater extended detection and sensing range than the first stereo vision system.

The method of computing a high precision distance estimate at extended range using an iVidar includes: estimating an object distance in a field of view A2, estimating an object distance in a field of view A3 and estimating an object distance in a field of view A1.

The method of estimating an object distance in a field of view A2 using the second stereo vision system includes: computing epipolar line feature disparity, detecting an object O2 with artificial intelligent object detection neural network, registering object O2 along-track distance with a cluster of feature disparity on the boundary of the detected object O2 and compute the distance estimate based on disparity map and perspective location, outputting at least one of a disparity map, a pixel-based distance map, point clouds, or cuboid coordinates C2 of the object O2.

The method of estimating an object distance in a field of view A3 using the monocular vision system includes: detecting an object O3 with artificial intelligent object detection neural network, associating the object O3 with O2 detected by the second stereo vision system if O3 is also in the field of view A2, tracking the object O3 the size change and perspective location to compute the distance estimate if O3 is outside the FOV A2, outputting at least one of a disparity map, a pixel-based distance map, point clouds, or cuboid coordinates C3 of the object O3.

The method of estimating an object distance in a field of view A1 using the first stereo vision system includes: computing epipolar line feature disparity, detecting an object O1 with artificial intelligent object detection neural network, associating the object O1 with O2 detected by the second stereo vision system if O1 is also in the field of view A2, associating the object O1 with O3 detected by the monocular vision system if O1 is also in the field of view A3, registering object O1 along-track distance with a cluster of feature disparity on the boundary of the detected object O1 and compute the distance estimate based on disparity map and perspective location, estimating the object O1 distance as the maximal confidence distance of among the first stereo vision system estimate, the second stereo vision system estimate and the monocular vision system estimate, outputting at least one of a disparity map, a pixel-based distance map, point clouds, or cuboid coordinates C1 of the object O1.

DETAILED DESCRIPTION

Figure 1:
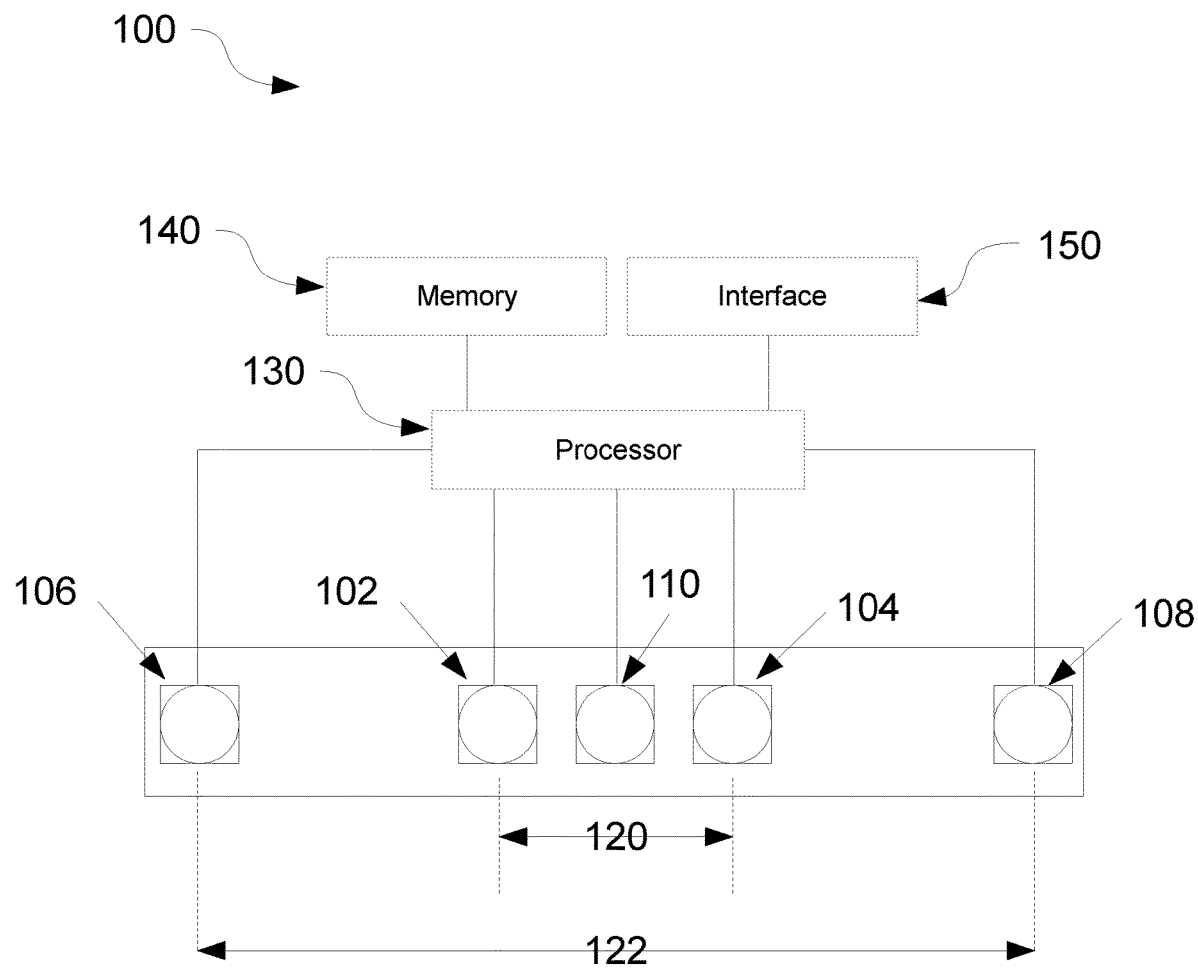
FIG. 1 illustrates one embodiment of intelligent vision-based detection and ranging system including two stereo vision systems, a monocular vision system, a processor, a memory and a network interface.

FIG. 1 is a schematic block diagram illustrating an example intelligent vision-based detection and ranging system 100. In this example, the system 100 includes five cameras 102, 104, 106, 108, 110, a processor 130, a memory 140, and a network interface 150. In the example system, the system 100 are in communication with a car or robot navigation system (not shown in FIG. 1) via the network interface 150 using wired and/or wireless communication schemes.

In one of the preferred embodiments, the processor 130 is an Intel Movidius Myriad X VPU with a Neural Computing Engine in conjunction with 16 cores. It can connect up to 8 cameras to the VPU directly. Another embodiment, the processor 130 could be an embedded AI computing system such as Nvidia AGX Xavier that consists of 512-core GPU with 64 tensor cores and 8-core Arm CPU.

The camera 102 and camera 104 connected to a processor 130 and a memory 140 form a first stereo vision system. The camera 106 and camera 108 connected to a processor 130 and a memory 140 form a second stereo vision system. In additionally, the camera 110 connected to a processor 130 and a memory 140 forms a monocular vision system.

Figure 2:
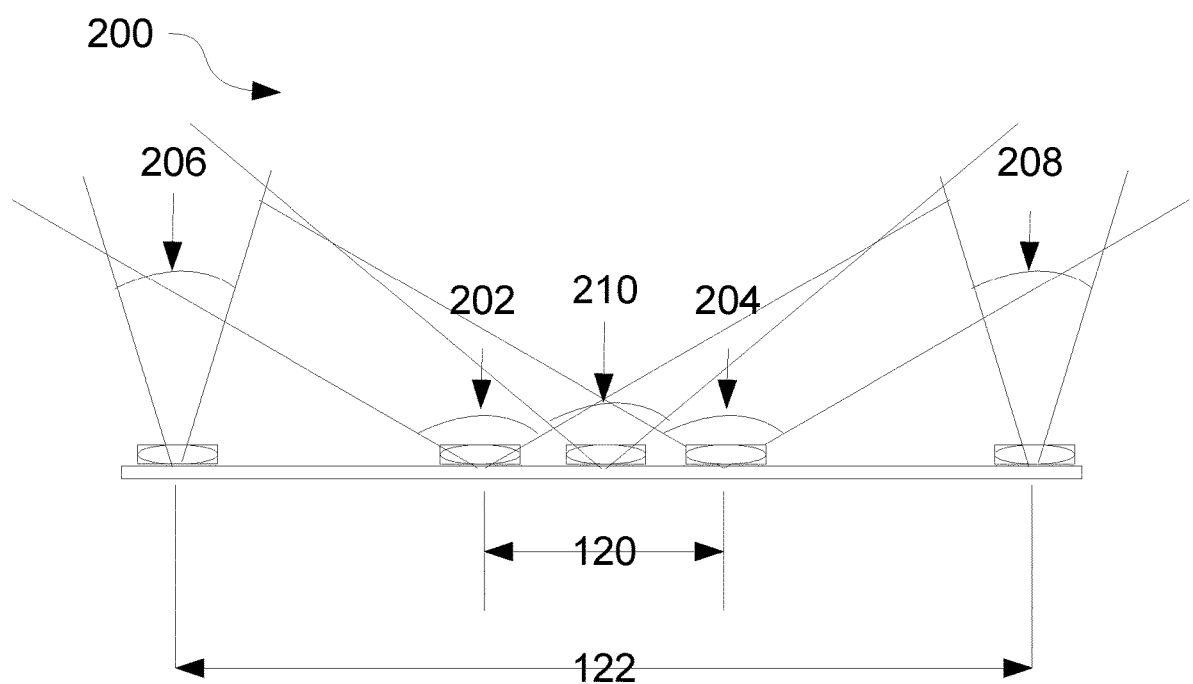
FIG. 2 illustrates the horizontal field of views of two stereo vision systems and a monocular vision system.

FIG. 2 illustrates an example configuration of horizontal field of views of a first stereo vision system, a second stereo vision system and a monocular vision system. The field of views 202, 204 of a first stereo vision system of camera 102 and camera 104 with the same focal length are merged into the same field of view at infinity and designated as A1. The distance between the center of the field of view 202 of the camera 102 and the center of the field of view 204 of the camera 104 is called baseline 120 and designated as B1. Similarly, the field of views 206, 208 of a second stereo vision system of camera 106 and camera 108 with the same focal length are merged into the same field of view at infinity and designated as A2. The distance between the center of the field of view 206 of the camera 106 and the center of the field of view 208 of the camera 108 is called baseline 122 and designated as B2. Additionally, the field of view 210 of the monocular vision system is designated as A3.

In one of the preferred configurations, a first stereo vision system field of view A1 is greater than a second stereo vision system field of view A2. A second stereo vision system baseline B2 is greater than a first stereo vision system base line B1. Furthermore, A1 may have an overlap area with A2. And A3 may have an overlap area with at least one of A1 and A2.

In one embodiment, in the first stereo vision system, both camera 102 and camera 104 are using OmniVision OV9282 global shutter monochrome CMOS sensors with 1280×800 resolution. The field of view A1 is 120 degree horizontally and 80 degree vertically. And the baseline B1 between camera 102 and camera 104 is 10 cm. In the second stereo vision system, both camera 106 and camera 108 are also using OmniVision OV9282 global shutter monochrome CMOS sensors with 1280×800 resolution. However, the field of view A2 is 34 degree horizontally and 22.7 degree vertically. And the baseline B2 between camera 106 and camera 108 is 25 cm. In the monocular vision system, camera 110 is using Sony's IMX464 rolling shutter color CMOS sensor with 2688×1520 resolution. The field of view A3 is 87 degree horizontally and 58 degree vertically.

In another embodiment, both first stereo vision system cameras and second stereo vision system cameras are using extremely low light sensitive Sony's IMX482 with 1920×1080 resolution. It can achieve 0.08 lux low light SNR to achieve better night time detection capability. And for monocular vision system camera, the Sony's IMX485 to achieve even higher resolution of 3840×2160 to further improve the object distance estimate accuracy.

Figure 3:
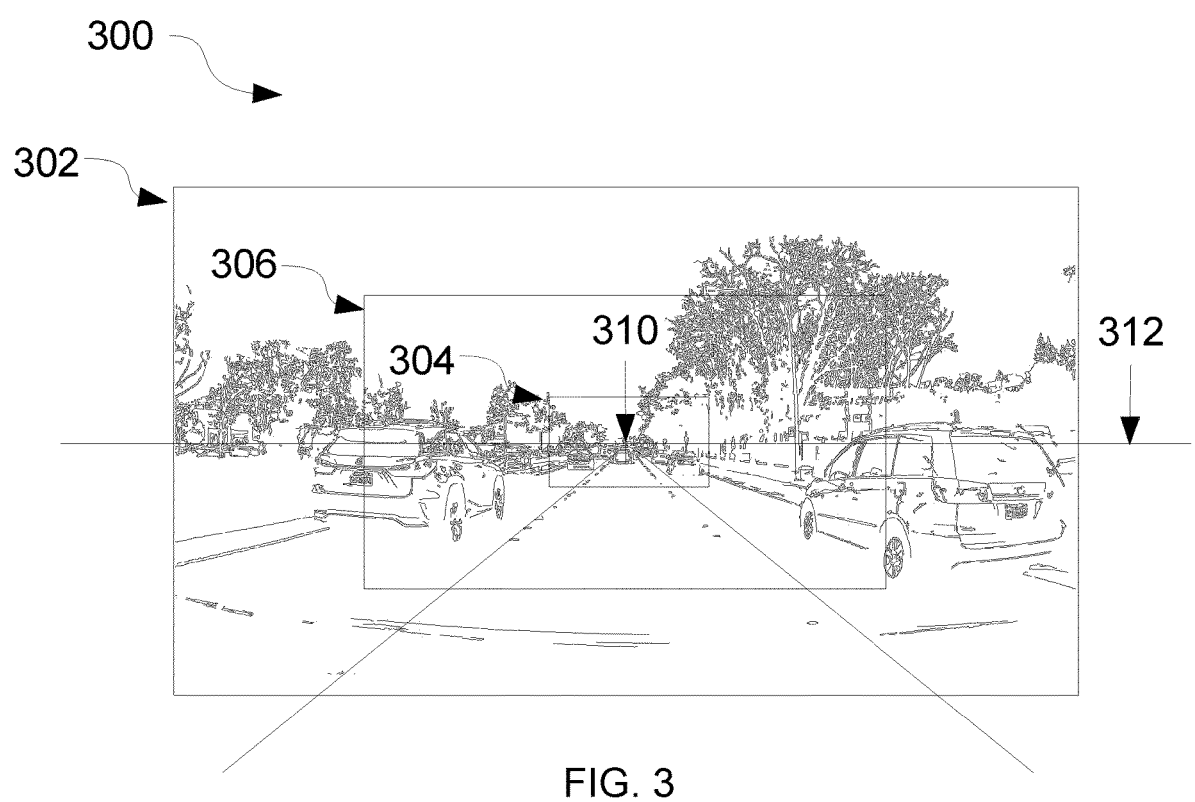
FIG. 3 illustrates a perspective view of field of views of two stereo vision systems and a monocular vision system.

FIG. 3 illustrates a perspective view of field of views of two stereo vision systems and a monocular vision system. The horizontal line 312 is the horizon of the perspective view. The point 310 is the vanishing point of the perspective view. At infinity, the baseline B1 is negligible thus field of views 202 and 204 merge into a single field of view 302 A1 in perspective view. Similarly, at infinity, the baseline B2 is negligible thus field of views 206 and 208 merge into a single field of view 304 A2. The perspective view of field of view A3 is 306.

In one of the preferred embodiments, a second stereo vision system field of view A2 304 center should align at the perspective view vanishing point 310. A monocular vision system field of view A3 306 center should locate within the field of view A2 304. Likewise, A first stereo vision system field of view A1 302 center should also locate within the field of view A2 304.

In yet another preferred embodiments, all field of views A1 302, A2 304, A3 306 centers should align at the perspective view vanishing point 310.

Figure 4:
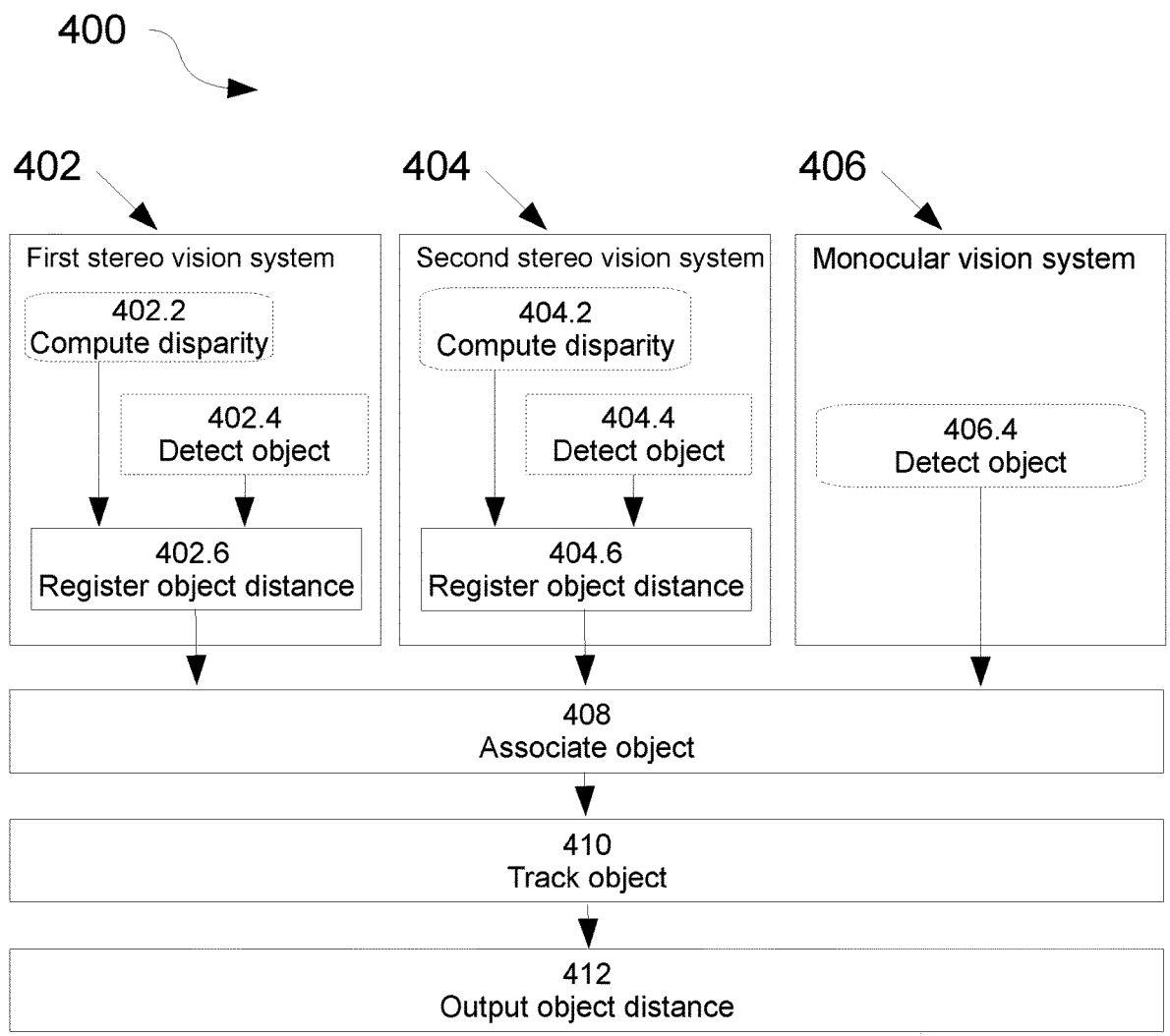
FIG. 4 illustrates a flow chart of an intelligent vision-based detection and ranging method.

FIG. 4 illustrates a flow chart of steps of an intelligent vision-based detection and ranging method. The steps 402, 404 and 406 are parallel steps of processing the synchronous image frames from a first stereo vision system, a second stereo vision system and a monocular vision system. All the steps 402, 404, 406 can be processed in parallel in a processor 130 with multi-core CPUs and a multi-tasking operating system.

In step 402, it includes step 402.2 to compute epipolar line stereo disparity of a first stereo vision system between a camera 102 image frame and a camera 104 image frame. Both image frames are synchronized with the same capture time and the same exposure control parameters. In one of the preferred embodiments, both image frames can be rectified and performed feature extraction such as edge detection before computing stereo disparity. An example disparity estimate neural network algorithms is called "Pyramid stereo matching network" published in Conference on Computer Vision and Pattern Recognition (CVPR), 2018 by J. R. Chang and Y. S. Chen. Furthermore, the resulting disparity map can be further refined to achieve sub-pixel accuracy using parabola curve fitting to a local neighborhood of global maximal correlation exemplified by a paper titled "High Accuracy Stereovision Approach for Obstacle Detection on Non-Planar Roads" by Nedevschi, S. et al. in Proceedings of the IEEE Intelligent Engineering Systems (INES), 19-21 Sep. 2004, pp 211-216.

In step 402, it also includes step 402.4 to detect objects in the image frame captured by a camera 102 and/or in the image frame captured by a camera 104. If resources allowed, step 402.2 and step 402.4 can be performed in parallel without depending to each other in terms of processing order. An example object detection neural network algorithms is called YOLO (You only look once) first published in Computer Vision and Pattern Recognition (CVPR), 2017 IEEE Conference on pages 6517-6525, by J. Redmon and A. Farhadi, titled: "Yolo9000: Better, faster, stronger". In a preferred embodiment, a YOLOv3 is used to achieve real-time object detection at frame rate about 30 frames per second (fps). Other object detection neural network algorithms can be used as well, for example, MobileNets-SSD, published by Andrew G. Howard, et al. at Cornell University, arXiv:1704.04861[cs.CV], on Apr. 17, 2017.

In step 402, it includes step 402.6 which follows steps 402.2 and 402.4. In step 402.6, the object detected in a bounding box in step 402.4 will be registered with the disparity estimated in step 402.2. Typically, for example, if the object is a car, then a cuboid coordinates or the point clouds will be computed by using the disparity map established in step 402.2 within the bounding box as depicted in a paper "Pseudo-LiDAR from Visual Depth Estimation: Bridging the Gap in 3D Object Detection for Autonomous Driving" by Yan Wang, et al. at Cornell University, arXiv: 1812.07179v5 [cs.CV], on Jun. 14, 2019.

Figure 5:
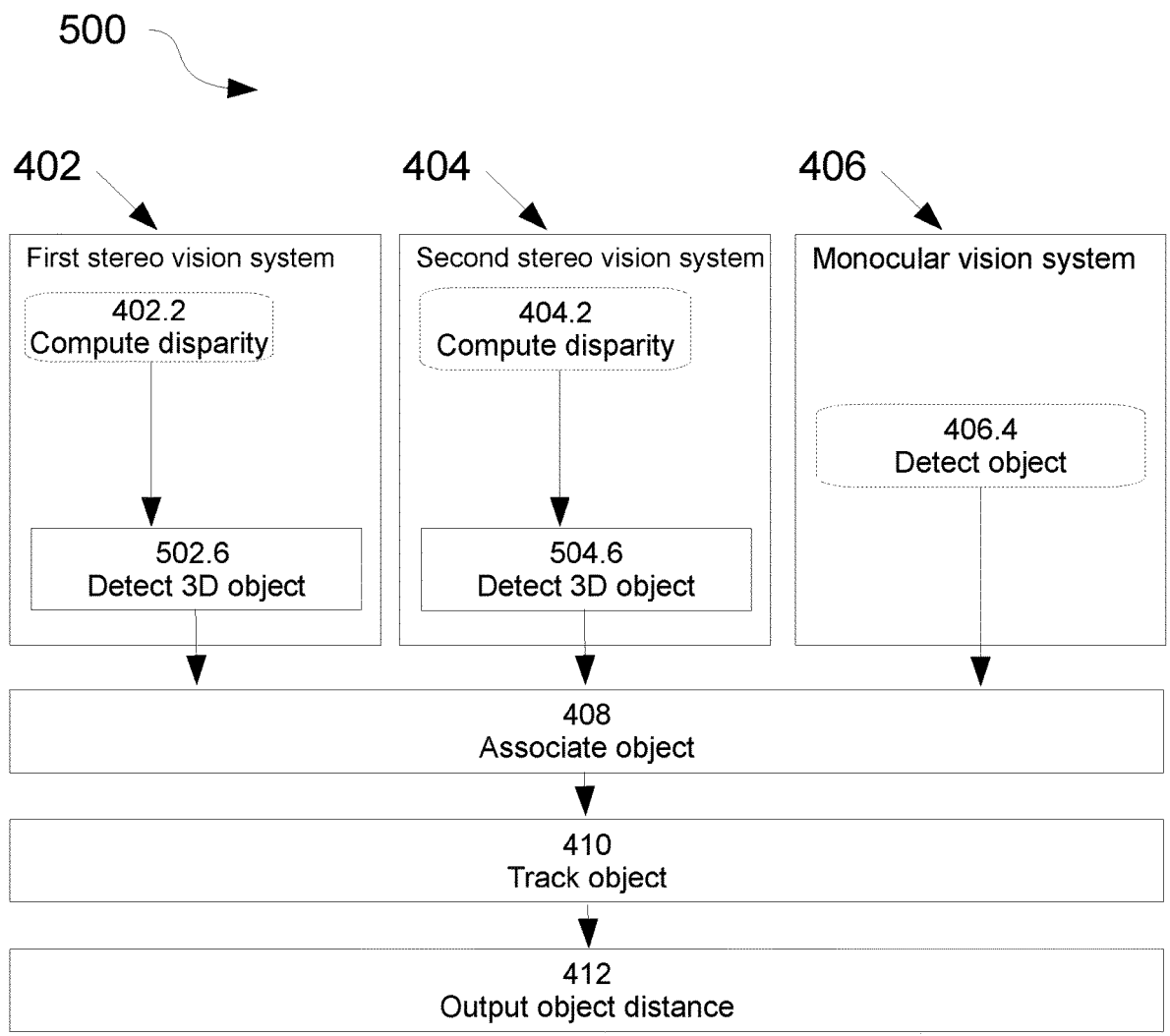
FIG. 5 illustrates another flow chart of an intelligent vision-based detection and ranging method.

In another approach as shown in the FIG. 5, the disparity map from 402.2 can be combined with synchronized frame images from camera 102 and camera 104 and then feed into a 3D object detection neural network 502.6. The 3D object detection neural network 502.6 can output a registered object distance directly. Thus saving the step of conventional 2D object detection 402.4.

The 3D object detection neural network algorithms 502.6 is an extension of a conventional 2D Single Shot MultiBox Detector (SSD). An example of SSD Neural Network is published by Wei Liu, et al. at Cornell University, arXiv: 1512.02325v5 [cs.CV], on Dec. 29, 2016. Instead of trained by a set of 2D images and 2D bounding boxes ground truth, a 3D object detection neural network (3D-SSD) is trained by a set of 2D images with its associated stereo disparity map and 3D cuboid ground truth. Architecturally, 3D-SSD adds one disparity channel in additional to original RGB channel (or gray level channel) for deep convolutional feature map extraction. Then it extends 2D anchors (cx,cy,width,height) target bounding boxes into 3D anchors (cx,cy,cz,width, height,depth) target cuboids. During training, 3D-SSD will use cuboid loss function to learn to adjust (dx,dy,dz,dw,dh, dd) to match the ground truth cuboid. The registered object distance therefore is cz+dz. This combination of step 402.4 and step 402.6 in FIG. 4 into one step 502.6 in FIG. 5 further reduces the computation cost and the system latency which boosts up the overall frame rate performance of the current invention.

Refers to FIGS. 4 and 5. In the concurrent step 404, they are exactly the same step as 402 except processing the synchronized image frames from camera 106 and camera 108 of a second stereo vision system.

In the concurrent step 406, there is only one step 406.4 in a monocular vision system. In step 406.4, a monocular vision system detects an object using the same YOLOv3 algorithms, for example. In one of the preferred embodiments, all cameras 102, 104, 106, 108 and 110 are synchronized in capture time. Thus the same object can be associated and tracked among different cameras.

In step 408, it associates the objects detected in steps 402.4, 404.4, 406.4 in FIG. 4 or 502.6, 504.6, 406.4 in FIG. 5. The associated objects thus are assigned the same label for the same object. For example an object detected by a second stereo vision system in step 404.4 in the field of view 304 located at the same perspective location of an object detected by a monocular vision system in step 406.4 in the field of view 306 are assigned the same label for the same object to be processed in the next step.

In step 410, it tracks each object from previous frame to the current frame and updates various parameters such as the object distance, velocity, cuboid coordinates, etc. For example, each object might have 3 distance estimates from a first stereo vision system, a second stereo vision system and a monocular vision system. At any particular frame, not all vision system has valid estimate. For example, at frame N, an object M might have 3 distance estimates forming as a vector of (inf, 157 m, N/A) where 1) the inf means the distance beyond the range of a first stereo vision system which covers from 0.1 m to 30 m and any object at >30 m away will be considered as distance at infinity; 2) 157 m is the distance estimate for the same object by a second stereo vision system which can cover range from 1 m to 200 m and any object at >200 m away will be considered as distance at infinity; 3) N/A means distance unknown in a monocular vision system. This object might be the first time show up in frame N and therefore there is no tracking record to estimate the size change compared with previous frame N−1 thus no distance estimate from a monocular vision system. As in frame N+1, the same object distance estimates might look like (inf, 156 m, 156.2 m). The monocular vision system computes the distance estimate of 156.2 m by using the previous frame N perspective object size change from current frame N+1 and previous best distance estimate 157 m for example. If the average of known distances is used as the best object distance estimate, then at frame N+1, the object distance estimate is 156.1 m (=average(156 m,156.2 m)). The velocity of the object at current frame might be updated as 156.1 m-157 m/33 ms/frame=−27.3 m/sec=−61 mile/hour approaching to the vehicle. In this example case, the vehicle has about 5.7 sec (=156.1 m/27.3 m/sec) to stop to avoid crashing into this object. In another embodiment, the object distance can be estimated from a monocular vision system by perspective view location in a 2D image with a level road and level vehicle pitch assumption. Thus an object first time show up in frame N in a monocular vision system, the distance can be estimated.

The cuboid coordinates of an object can be updated by the similar method as the distance estimate. For example, at frame N, three cuboid coordinates (C1, C2, C3) are estimated from a first stereo vision system, a second stereo vision system and a monocular vision system. Likewise, the possible value for cuboids including inf and N/A which stands for infinity and not available. Apply the same method as described in distance estimate, the cuboid coordinates are updated at each frame.

In step 412, it can be configured to output at least one of the following information: disparity map, point clouds, cuboids. The disparity map is generated from a first stereo vision system and a second stereo vision system. The point clouds are computed from disparity map.

The cuboids are computed from point clouds. An example formula of computing point clouds from disparity map is shown in a paper "Pseudo-LiDAR from Visual Depth Estimation: Bridging the Gap in 3D Object Detection for Autonomous Driving" by Yan Wang, et al. at Cornell University, arXiv:1812.07179v5 [cs.CV], on Jun. 14, 2019. An example algorithms of grouping point clouds to cuboids is illustrated in International Conference on Image and Graphics paper by Chengkun Cao, et al. Nov. 28, 2019, pp 179-190. If multiple estimates are available for disparity map, point clouds and cuboids for the same objects. The maximal confidence estimates are output. For example, for distance estimate, inf and N/A has no contribution to the distance estimate, thus an object distance estimate (inf, 157 m, N/A) results in maximal confidence estimate of 157 m. If more than one valid values are available, then the average of the valid values is the maximal confidence estimate, for example, (inf, 156 m, 156.2 m) results in maximal confidence estimate of 156.1 m. If each value has confidence score, then the maximal confidence estimate can be the confidence weighted average.

It is understood by those skilled in the art that by applying camera model information, a disparity map can be converted into a pixel-based distance map.

The flow diagrams depicted herein are just examples of current invention. There may be many variations to these diagrams or the steps (or operations) described therein without departing from the spirit of the disclosure. For instance, the steps may be performed in a differing order, or steps may be added, deleted or modified.

While embodiments have been described, it will be understood that those skilled in the art, both now and in the future, may make various improvements and enhancements can be made.

What is claimed is:

1. An intelligent vision-based detection and ranging system, comprising:
   a processor,
   a first stereo vision system with a field of view A1 and a baseline B1,
   wherein the first stereo vision system is configured to be communicatively coupled to the processor,
   wherein the processor uses a left frame image and a right frame image from the first stereo vision system to detect a same object by using a 3D object detection neural network,
   whereas the 3D object detection neural network is an extension of a 2D object detector by adding an additional RGB channel for deep convolutional feature map extraction;
   whereas the 3D object detection neural network is an extension of a 2D object detector by extending 2D anchors (cx, cy, width, height) target bounding boxes into 3D anchors (cx, cy, cz, width, height, depth) target cuboids.

2. The intelligent vision-based detection and ranging system of claim 1, further comprising:
   a second stereo vision system with a field of view A2 and a baseline B2,
   wherein the A1 is greater than the A2 and the B2 is greater than the B1,
   wherein the A1 may have an overlap area with the A2.

3. The intelligent vision-based detection and ranging system of claim 2, further comprising a monocular vision system with a field of view A3.

4. The intelligent vision-based detection and ranging system of claim 3, wherein the A3 may have an overlap area with at least one of the A1 and the A2.

5. The intelligent vision-based detection and ranging system of claim 2, wherein the B2 is at least 2× or greater than the B1 and the A1 is at least 3× or greater than the A2.

6. A method of estimating an object distance using an intelligent vision-based detection and ranging system, comprising:
   feeding a left frame image and a right frame image into a 3D object detection neural network from a stereo vision system;
   detecting a same object from the left frame image and the right frame image using the 3D object detection neural network;
   computing a cuboid of the same object using the 3D object detection neural network;
   whereas the 3D object detection neural network is an extension of a 2D object detector by adding an additional RGB channel for deep convolutional feature map extraction;
   whereas the 3D object detection neural network is an extension of a 2D object detector by extending 2D anchors (cx, cy, width, height) target bounding boxes into 3D anchors (cx, cy, cz, width, height, depth) target cuboids.

7. A method of estimating an object distance using an intelligent vision-based detection and ranging system, comprising:
   feeding a left frame image and a right frame image into a 3D object detection neural network from at least one of a first stereo vision system and a second stereo vision system;
   detecting a same object from the left frame image and the right frame image using the 3D object detection neural network;
   computing a cuboid of the same object using the 3D object detection neural network;
   whereas the 3D object detection neural network is an extension of a 2D Single Shot MultiBox Detector by adding an additional RGB channel for deep convolutional feature map extraction;
   whereas the 3D object detection neural network is an extension of a 2D Single Shot MultiBox Detector by extending 2D anchors (cx, cy, width, height) target bounding boxes into 3D anchors (cx, cy, cz, width, height, depth) target cuboids.

* * * * *